Dec. 6, 1938.  M. E. COLLINS  2,139,222
FOCUSING DEVICE
Filed Feb. 29, 1936

INVENTOR
MILFORD E. COLLINS
BY
ATTORNEY

Patented Dec. 6, 1938

2,139,222

UNITED STATES PATENT OFFICE 2,139,222

FOCUSING DEVICE

Milford E. Collins, Collingswood, N. J., assignor to Radio Corporation of America, a corporation of Delaware Application February 29, 1936, Serial No. 66,355

3 Claims. (Cl. 88—1)

This invention relates to a focusing device and, more particularly, to a focusing microscope adapted to accurately focus the image formed by a sound recording system on the film on which the recording is to be done.

In photographically recording sound on film, it is customary to run the film over a drum driven by an appropriate mechanism at a uniform speed and with the emulsion surface of the film outward. An optical system focuses a narrow line of light on the sound-track area of the film and this light is modulated either by the variable area or variable density systems to produce a correspondingly varying photographic record.

Since the line of light is of the order of $\frac{1}{10}$th of an inch in length and 4 to 6/10,000ths of an inch in width, it is necessary that the optical system be accurately focused on the emulsion surface of the film.

One object of my invention is to provide a focusing device which is adapted to correctly cooperate with the drum supporting the film.

Another object of my invention is to provide a focusing device including means which will locate it in a fixed and predetermined position in relation to the film drum.

Another object of my invention is to provide a focusing device including means which will maintain it in a fixed and predetermined position in relation to the emulsion surface of the film.

Another object of my invention is to provide such a focusing device which will determine the focus of the recording beam at the recording point under normal operating conditions.

Another object of the invention is to provide a focusing device of variable magnification.

Another object of the invention is to provide a focusing device with reference lines, whereby the exact positioning of the sound-track may be determined.

Other and incidental objects of the invention will be apparent to those skilled in the art from a reading of the following specification and an inspection of the accompanying drawing, in which.

Figure 1:
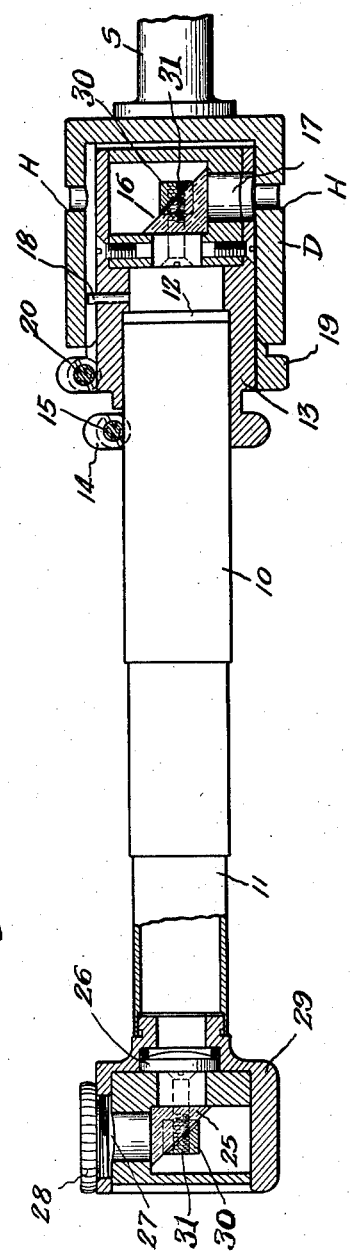
Figure 1 is a longitudinal view of my focusing device partly in section, arranged in cooperative relation with a film drum.

Referring to Fig. 1, D indicates a film drum adapted to carry the film during the recording operation. This drum may be made integral with a shaft S by which it is supported and driven and the drum is provided with diametrically opposite holes H adapted to cooperate with the focusing device in a manner hereinafter described.

The focusing device includes a body tube 10 provided with a draw tube 11 as is customary in microscopes. The body tube carries within the mounting ring 12 an objective lens of relatively long focus, i. e., about 1½ inches. This body tube is clamped within the member 13 by the split ring 14 and clamp screw 15 by which it may be so adjusted that the objective 12 is properly focused on a film exterior to one of the apertures H. Within the member 13 is mounted a reflecting prism 16 adapted to deflect the rays coming through one of the apertures H through a right angle to the objective 12. The member 13 is provided with a hole 17 in alignment with the face of the prism 16 for permitting light to enter from the aperture H. The inside of the member 13 opposite to the hole 17 is provided with a pin 18 which is so adjusted as to maintain the opposite face of the member 13 in contact with the interior of the drum D, thereby insuring that the objective mounted in the ring 12 will be always maintained in proper focal relationship to the surface of the emulsion.

The distance to which the member 13 enters into the drum D is determined by the split ring 19 which is clamped to the exterior of the member 13 by the screw 20. It will be noted that the screw 20 may be loosened and the member 13 adjusted therewithin to the correct position, the screw 20 thereafter being tightened and thus permanently determining the position of the device relative to the width of the film.

The objective lens 12, of course, forms an enlarged real image of the image upon the film within the tube 11. This image is in turn imaged within the prism 25 by the lens 26, this image lying in the middle of the hypotenuse of the triangular prism. The image as reflected from the prism 25 is further magnified by the other eye-piece lens 27 within the mounting 28.

The prism 25 and the lenses 26 and 27 are, of course, supported within the eye-piece body member 29. The prisms 16 and 25 may be held in place by appropriate blocks 30, bearing against their rear faces and urged toward the mounting by the screws 31.

Figure 2:
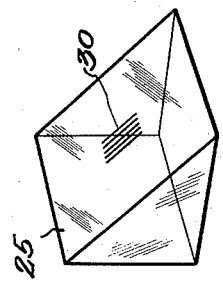
Fig. 2 is a perspective view of the eye-piece prism of the apparatus.

The prism 25, as shown in Fig. 2, is provided with a plurality of lines 30 in the middle of its hypotenuse face, the outer pair of these lines being at such a distance from each other that at the normal sound-track width the image of the line of light just fills the space between them. The central one of these fine lines indicates the axis of the sound-track and the normal position of the beam of light when used in the singly modulated variable area method. The other two lines are located midway between the outer lines and the middle line and indicate the positions of the margins of the beam of light at no modulation when using the doubly modulated variable area system.

It will be apparent from the foregoing that the image of the line of light is focused upon the hypotenuse of the prism 25 at the position of the lines 30 and its position laterally of the film can be determined and adjusted through the assistance of these lines, the position being magnified by the eye-piece lens 27.

The magnification for any given set of conditions is, of course, left fixed but if it is desired to change the magnification this may be accomplished by adjustment of the tube 10 within the member 13.

I claim:

1. A microscope adapted to focus adjacent to the exterior surface of a hollow member comprising a microscope tube, a mount adapted to position said tube axially and laterally in said member, reflecting means in said mount for directing light from the surface of said member into said tube, and an eye-piece comprising a reticule at the other end of the tube, the said reticule consisting of a reflecting prism having markings on its reflecting surface.

2. Apparatus for determining the focal position of a photophonographic optical system in relation to a drum adapted to peripherally carry film past a photophonographic translation point, the said drum being adapted to transmit light from the film position toward its axis, the said apparatus comprising, in combination, a microscope unit including an objective, an eyepiece, and means for maintaining said objective and eyepiece in fixed focal relation to each other, and a mounting unit for said microscope including reflecting means for directing radial rays parallel to the axis, means for securing said microscope in fixed relation to said reflecting means, and means adapted to engage said film drum and positively fix said microscope and reflecting means in interior relation thereto.

3. Apparatus for determining the focal position of a photophonographic optical system in relation to a drum adapted to peripherally carry film past a photophonographic translation point, the said drum being adapted to transmit light from the film position toward its axis, the said apparatus comprising, in combination, a microscope unit including an objective, an eyepiece, and means for maintaining said objective and eyepiece in fixed focal relation to each other, and a mounting unit for said microscope including reflecting means for directing radial rays parallel to the axis, means for securing said microscope in fixed relation to said reflecting means, means adapted to engage the interior of said film drum radially for axially fixing said microscope and reflecting means in relation thereto, and means for engaging said film drum externally at its end for longitudinally fixing said microscope and reflecting means in relation thereto.

MILFORD E. COLLINS.